United States Patent [19]

Fukuda

[11] Patent Number: 5,795,231
[45] Date of Patent: Aug. 18, 1998

[54] FLEXIBLE SHAFT COUPLING

[75] Inventor: Kazuichi Fukuda, Fujisawa, Japan

[73] Assignees: Shoyo Engineering Co., Ltd., Tokyo; Kyushu Hasec Co., Ltd., Noogata, both of Japan

[21] Appl. No.: 788,439

[22] Filed: Jan. 28, 1997

Related U.S. Application Data

[63] Continuation-in-part of Ser. No. 181,316, Jan. 13, 1994, abandoned.

[30] Foreign Application Priority Data

Jan. 14, 1993 [JP] Japan ................ 5-005015

[51] Int. Cl.$^6$ ........................................ F16D 3/12
[52] U.S. Cl. .............. 464/65; 464/137; 267/167; 267/286
[58] Field of Search ................ 464/51, 61, 62, 464/65, 81, 85, 106, 137; 267/167, 166, 286

[56] References Cited

U.S. PATENT DOCUMENTS

| | | | |
|---|---|---|---|
| 1,783,158 | 11/1930 | Eckart | 464/65 |
| 2,096,039 | 10/1937 | Higgins | 464/61 |
| 2,453,383 | 11/1948 | Rathman | |
| 2,509,997 | 5/1950 | Tea | 464/61 X |
| 2,899,809 | 8/1959 | Battaline | |
| 3,668,891 | 6/1972 | Brizzolesi | 464/85 X |
| 3,952,547 | 4/1976 | Klein et al. | 464/51 |
| 4,019,346 | 4/1977 | Fukuda | 464/137 X |
| 4,416,645 | 11/1983 | Fredericks | 464/81 X |
| 4,639,237 | 1/1987 | Fukuda | |
| 5,415,587 | 5/1995 | Fenley | 464/137 X |

FOREIGN PATENT DOCUMENTS

| | | | |
|---|---|---|---|
| 644754 | 7/1964 | Belgium | |
| 6-213247 | 8/1994 | Japan | |
| 0066142 | 10/1928 | Sweden | 464/65 |
| 0 373 064 | 5/1932 | United Kingdom | 464/65 |
| 373064 | 5/1932 | United Kingdom | |

*Primary Examiner*—Donald P. Walsh
*Assistant Examiner*—William A. Rivera
*Attorney, Agent, or Firm*—Wenderoth, Lind & Ponack, L.L.P.

[57] ABSTRACT

A flexible shaft coupling has first and second hubs provided with outwardly extending flanges formed at ends of cylindrical parts of the hubs. Each may be connected to a transmission shaft. The flange of the first hub has a plurality of spring holes therein located within the periphery thereof. A holder is fitted over the cylindrical part of the first hub and fixed to the flange of the second hub so as to hold the flange of the first hub between the holder and the flange of the second hub. Barrel-shaped coil springs pass through the spring holes in the flange of the first hub. Each barrel-shaped coil spring is compressed between the second hub and the holder so that the coil springs deflect to bring adjoining coils thereof into contact with each other when torque is transmitted. The largest-diameter portion of the barrel-shaped coil spring is fitted tight in the spring hole in the first hub, and the smallest-diameter portion thereof is fitted tight over a pin held between the flange of the second hub and the holder. A space sufficient for accommodating shaft misalignments is provided between the flange of the first hub and each of the second hub and the holder. An annular cover could also be employed in place of the second hub.

12 Claims, 10 Drawing Sheets

FLEXIBLE SHAFT COUPLING

This is a continuation-in-part application of the U.S. patent application Ser. No. 08/181,316 filed on Jan. 13, 1994 now abandoned.

BACKGROUND

This invention relates to a flexible shaft coupling that effectively absorbs shock and damps torsional vibration.

One type of elastic shaft coupling uses coil springs as its flexible member. In one variation of this type, the coil springs are disposed to change their shape at right angles to the axis thereof. Dispensing with spring seats, this type of flexible shaft coupling has a simple and small structure that results in a smaller moment of inertia. U.S. Pat. No. 4,639,237 discloses an example of this type of flexible shaft coupling.

A flexible shaft coupling according to U.S. Pat. No. 4,639,237 comprises a first and a second hub, each of which has a flange at one end of the cylindrical part thereof and is connected to a transmission shaft, a holder fixed to the flange of the second hub so that the cylindrical part of the first hub passes therethrough and the flange of the first hub is contained therein, and coil springs passed through spring holes provided along the circumference of the flange of the first hub. The first and second hubs are dispossed so that the flanges thereof face each other across a space left therebetween. The coil springs are compressed between the flange of the second hub and the holder. Torque transmission between the first and second hubs is achieved through the coil springs. The coil springs accommodate shaft misalignments and absorb the shock load working on the transmission shaft by changing their deflection. In addition, the coupling is composed with the coil springs fitted tight in the spring holes without backlash so as to rotate at an angle with high accuracy.

In the conventional flexible shaft couplings of the type described above, however, the coil springs deflect perpendicularly to the spring axis between the flange of the first hub and each of the flanges of the second hub and holder. As this deflection exerts a high stress in the coil springs, their deflection must be kept at a comparatively small amount. This type of coupling, in turn, has resulted in a limited accommodation of shaft misalignments, absorbing shock load and reducing torsional-vibration. Therefore, the development of flexible shaft couplings that provide a much greater accommodation of shaft misalignments, absorption of shock load and reduction of torsional-vibration without backlash has been awaited.

Austrian Patent No. 213168 (Geislinger) covers a flexible shaft coupling of this type. This flexible shaft coupling comprises laminated leaf springs superposed between a spring holder and an intermediate ring. Oil is supplied to the chamber constructed between the laminated leaf springs and spacing fragments. The spring characteristic is nonlinear because of the elastic deformation of the springs and the viscosity of the oil. This flexible shaft coupling absorbs shock and torsional vibration by utilizing the elastic deformation of the springs and the viscosity of the oil. Still, the use of laminated leaf sprigs makes the outside diameter of this flexible shaft coupling too large as compared with the amount of the torque transmitted. This, in turn, enlarges the overall size of the flexible shaft coupling and the amount of $GD^2$.

A flexible shaft coupling covered by U.S. Pat. No. 2,453,383 (Rathman) comprises a barrel-shaped coil spring that is fitted to a flange so that the axis of the spring extends parallel to the power transmission shaft. Torque is transmitted when a load perpendicularly to the axis of the spring acts on the barrel-shaped coil spring. However, the specification of the patent makes no mention of the spring characteristic that absorbs shock and damps torsional vibration.

SUMMARY

The object of this invention is to provide a compact, backlash-free flexible shaft coupling that effectively assures proper axial alignment, absorbs shock and damps torsional vibration.

A flexible shaft coupling according to this invention comprises a first and a second hub, each of which has an outwardly extending flange formed at one end of the cylindrical part thereof and is connected to a transmission shaft, the flange of the first hub having a plurality of spring holes perforated therethrough and along the circumference thereof, a holder fitted over the cylindrical part of the first hub and fixed to the flange of the second hub so as to hold therein the flange of the first hub that faces the flange of the second hub across a space left therebetween, and barrel-shaped coil springs passed through the spring holes in the flange of the first hub. Each barrel-shaped coil spring is compressed between the second hub and holder so that the coil spring deflects to bring the adjoining coils thereof into contact with each other when torque is transmitted. While the largest-diameter portion of the barrel-shaped coil spring is fitted tight in the spring hole in the first hub, the smallest-diameter portion thereof is fitted tight over a pin held between the flange of the second hub and the holder.

A space large enough for accommodation of shaft misalignments is left between the first hub and each of the second hub and holder.

Torque is transmitted from the drive shaft through the first hub connected thereto, barrel-shaped coil springs fitted tight in the spring holes in the flange of the first hub, the pins held between the flange of the second hub and the holder with the barrel-shaped coil springs fitted tight thereover and the second hub, and then to the driven shaft connected to the second hub, or in the reverse direction. The loaded side of the middle part of the barrel-shaped coil springs is compressed inward to an extent that varies with the amount of the torque transmitted. The barrel-shaped coil springs accommodate shaft misalignments by their deflection in axial, radial and angular directions. The deflection of the barrel-shaped coil springs and the friction between the adjoining coils thereof absorb the shock load and reduce the torsional-vibration exerted on the transmitting system.

A load perpendicular to the axis of the spring acting on the middle of the barrel-shaped coil spring of the flexible shaft coupling described above has a nonlinear relationship with the deflection of the spring, as in the case of the superposed laminated leaf springs. This spring exhibits a small spring constant when subjected to low loads and a great spring constant when subjected to high loads. Furthermore, the barrel-shaped coil spring exhibits hysteresis characteristics when the applied load increases and decreases because of the contact and friction between adjoining wires composing coil of the spring. This invention is based on the knowledge of the spring characteristics described above. Using the nonlinear spring characteristics unobtainable from the conventional flexible shaft coupling comprising a single coil spring, the flexible shaft coupling of this invention can transmit great torques, absorb great shocks and damp great torsional vibrations despite its compact size.

DRAWINGS

Figure 10:
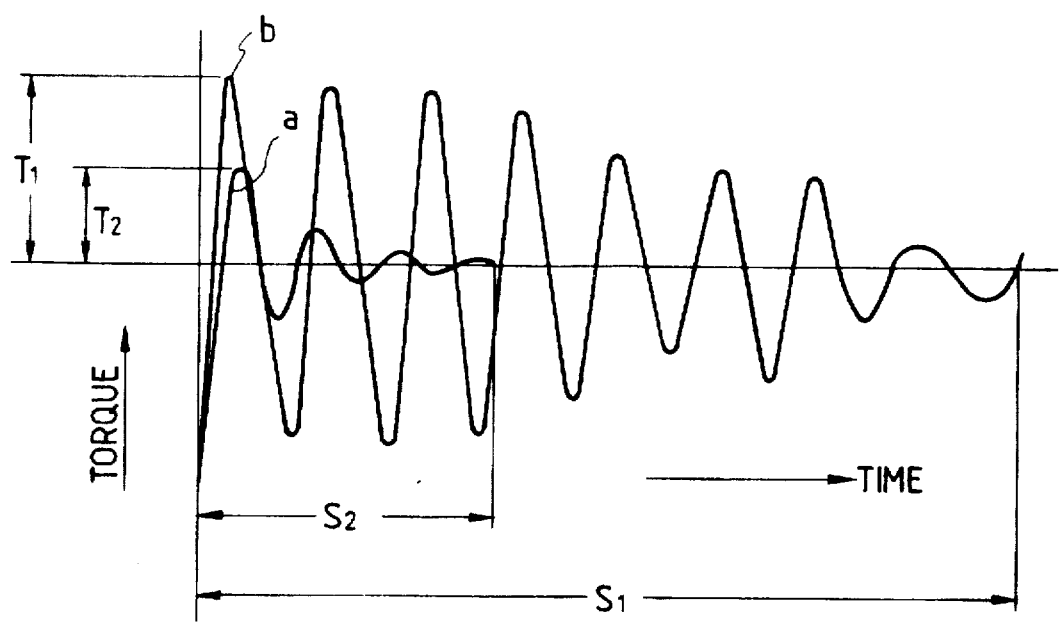

FIG. 10 schematically illustrates the absorption of shock load and the reduction of torsional-vibration.

Figure 11:
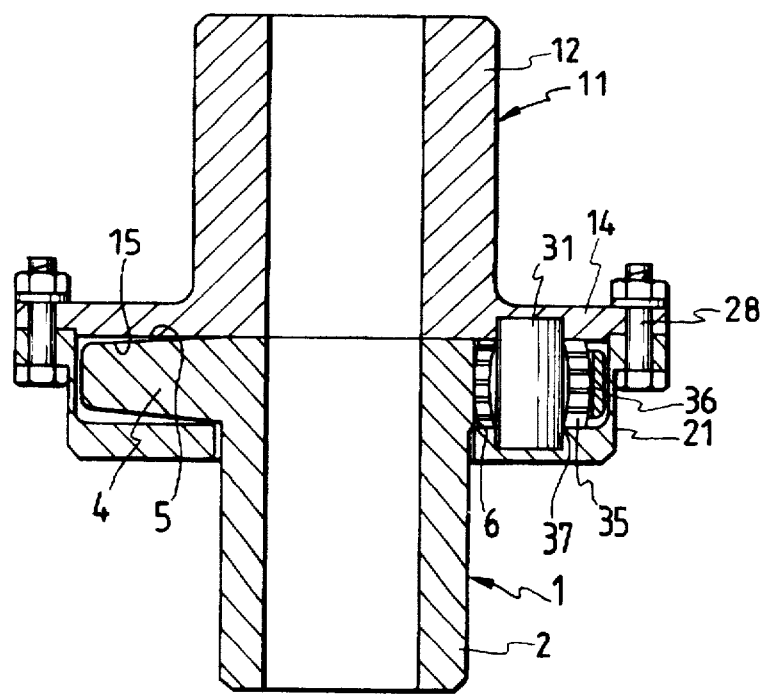

FIG. 11 is a vertical cross-sectional view of a flexible shaft coupling of this invention in vertical use.

Figure 12:
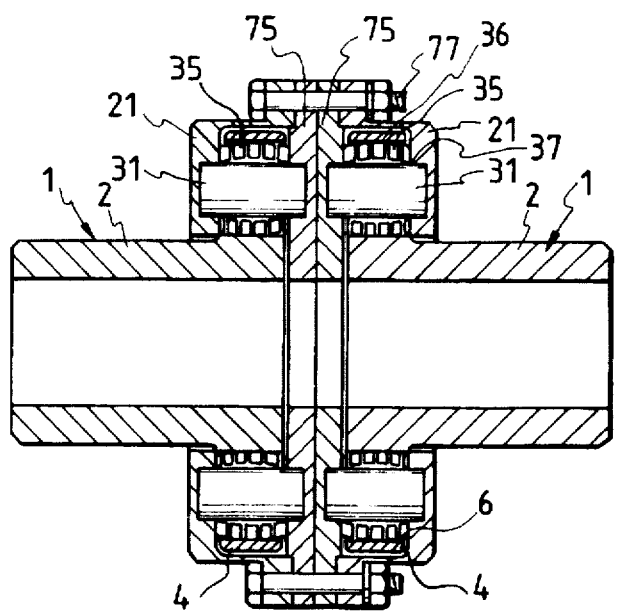

FIG. 12 is a vertical cross-sectional view of a shaft coupling consisting of two flexible shaft couplings of this invention fixed together.

Figure 13:
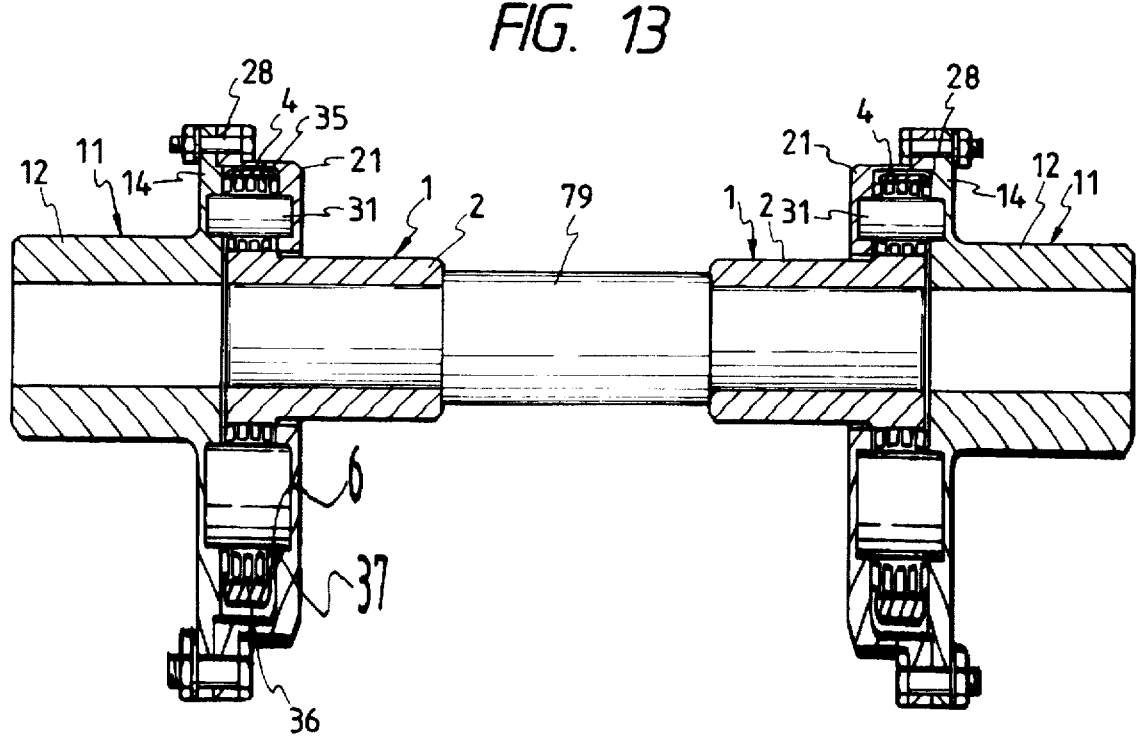

FIG. 13 is a vertical cross-sectional view of a shaft coupling consisting of two flexible shaft couplings of this invention fixed together with an intermediate shaft interposed therebetween.

Figure 14:
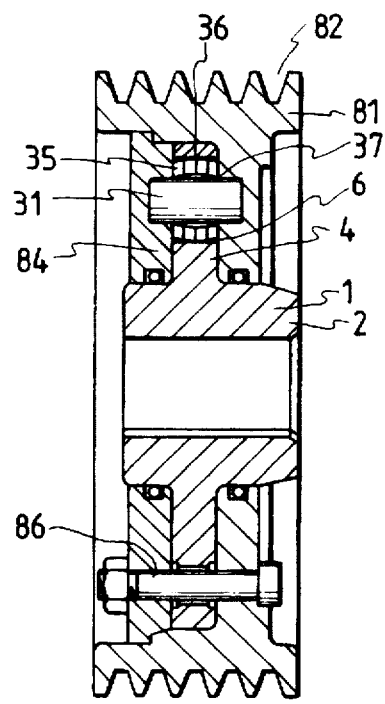

FIG. 14 is a vertical cross-sectional view of a flexible shaft coupling of this invention incorporated in a V-belt pulley.

Figure 15:
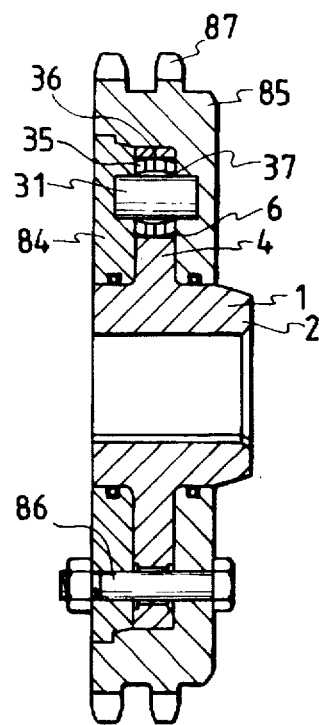

FIG. 15 is a vertical cross-sectional view of a flexible shaft coupling of this invention incorporated in a sprocket.

Figure 16:
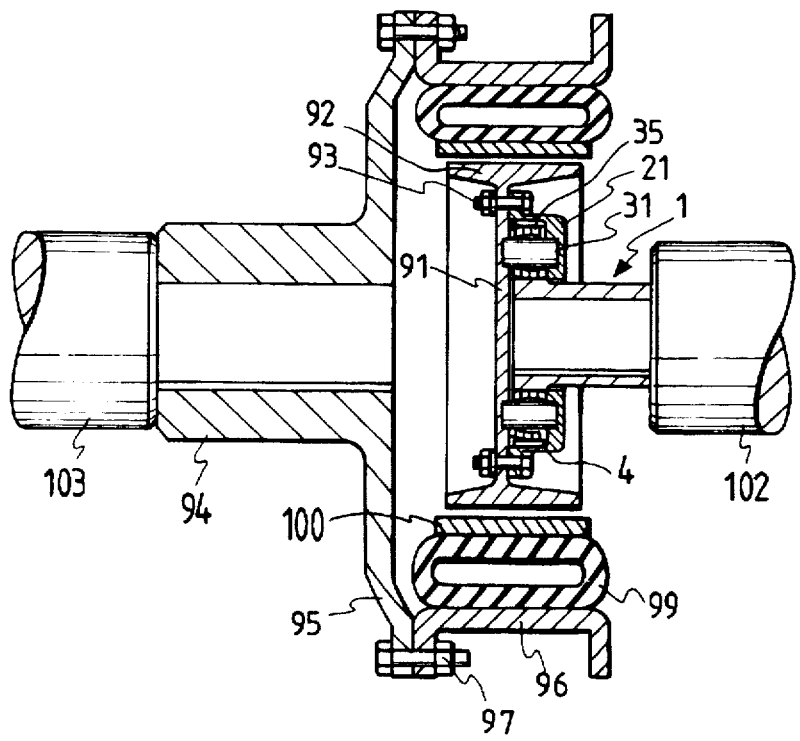

FIG. 16 is a vertical cross-sectional view of a flexible shaft coupling of this invention incorporated in an air clutch, under the state of OFF in transmission.

Figure 17:
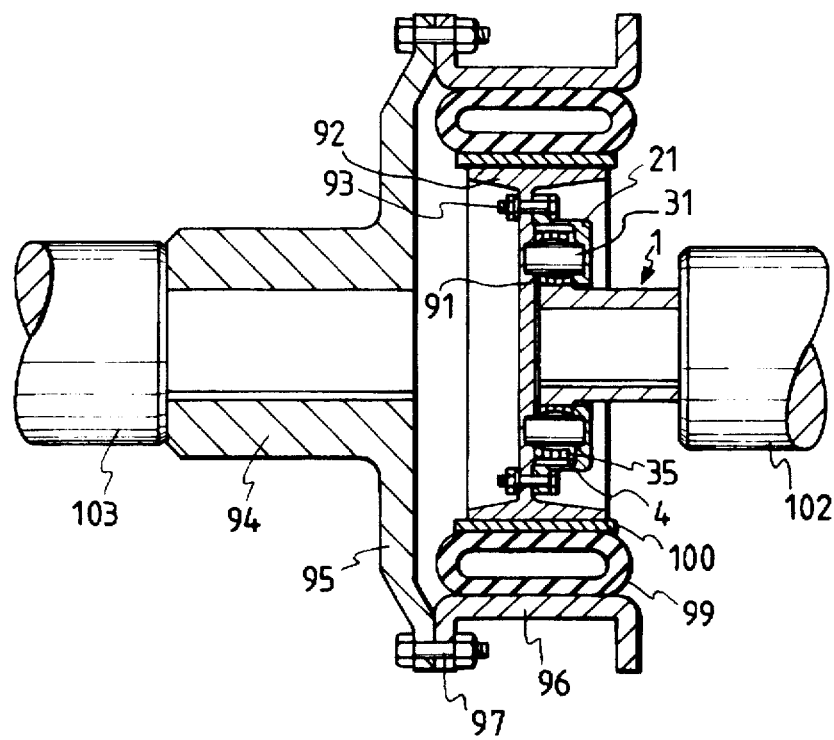

FIG. 17 shows the air clutch of FIG. 16 under the state of ON in transmission.

Figure 18:
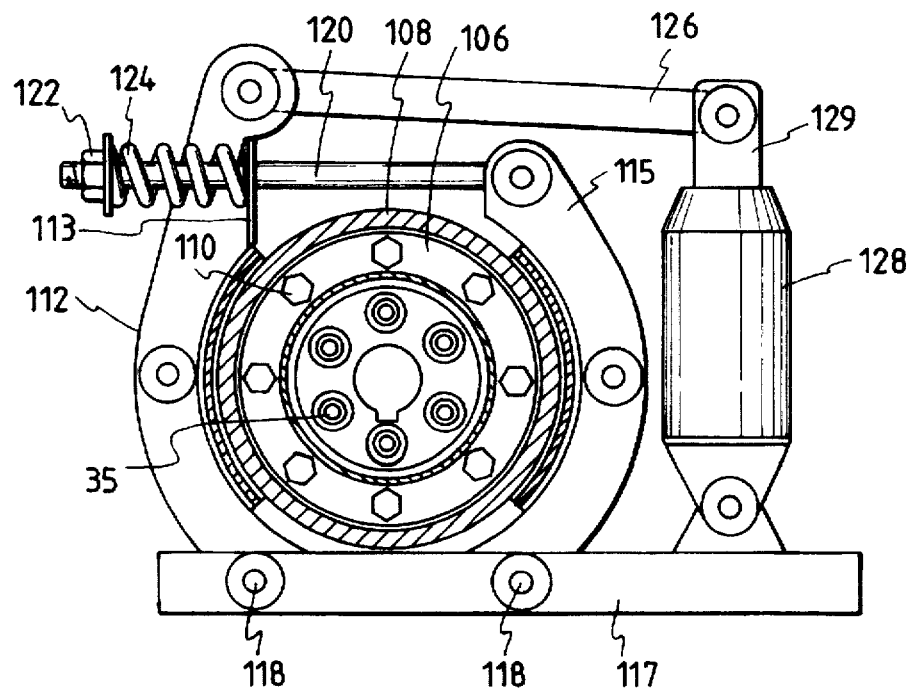

FIG. 18 is a partial cross-sectional front view of a brake in which a flexible shaft coupling of this invention is incorporated.

Figure 19:
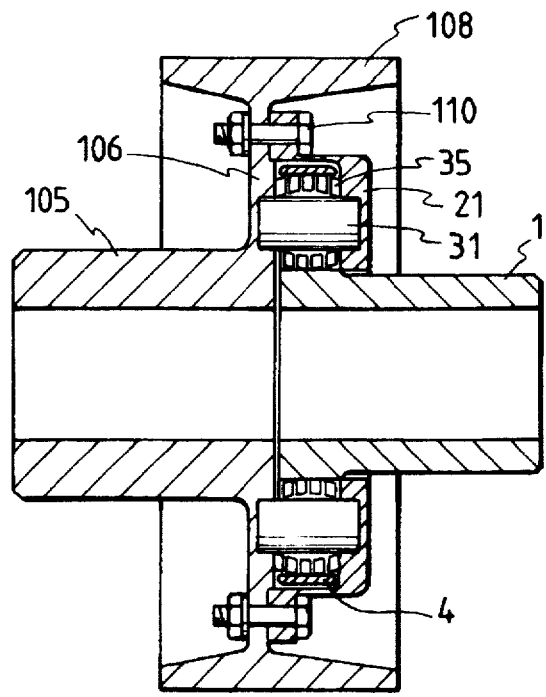

FIG. 19 is a vertical cross-sectional view of the brake drum of the brake shown in FIG. 18.

Figure 20:
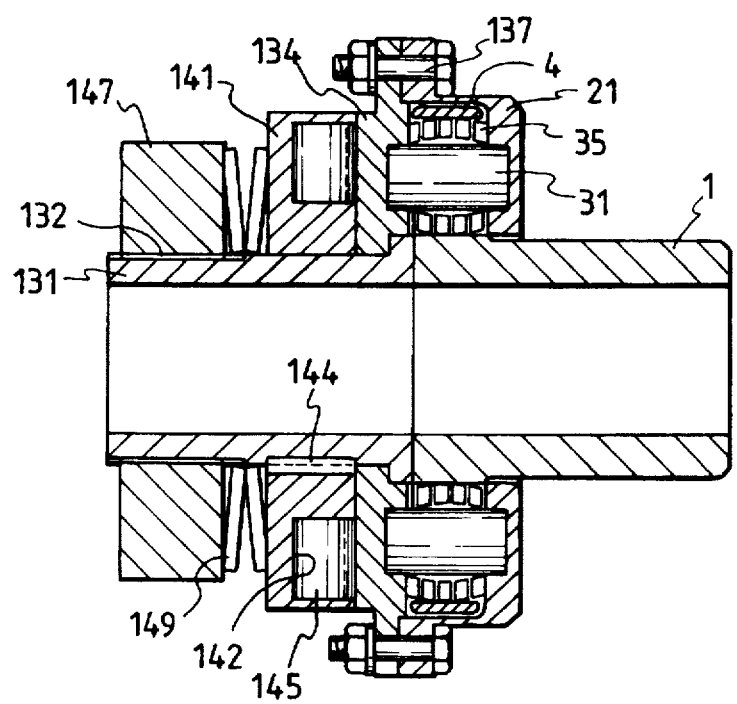

FIG. 20 is a vertical cross-sectional view of a torque limiter in which a flexible shaft coupling of this invention is incorporated.

Figure 21:
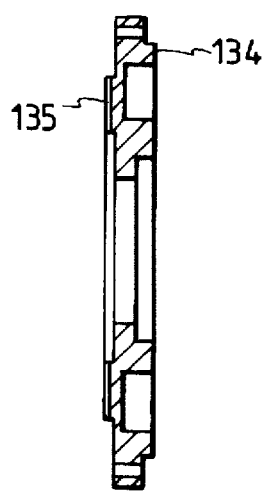

FIG. 21 is a vertical cross-sectional view of the annular cover of the torque limiter shown in FIG. 20.

Figure 22:
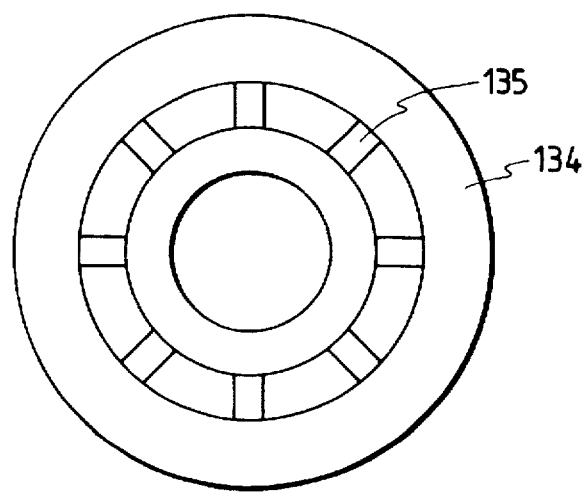

FIG. 22 is a front view of the annular cover shown in FIG. 21.

Figure 23:
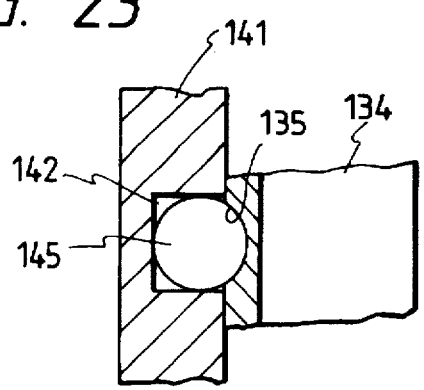

FIG. 23 is a magnified cross-sectional view of a portion of the same torque limiter.

DESCRIPTION

Figure 1:
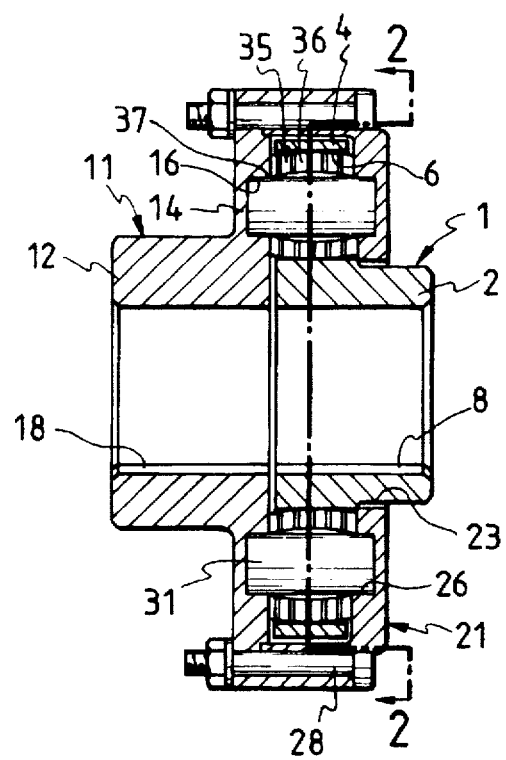
FIG. 1 is a vertical cross-sectional view of a first preferred embodiment of arrows flexible shaft coupling according to this invention.
Figure 2:
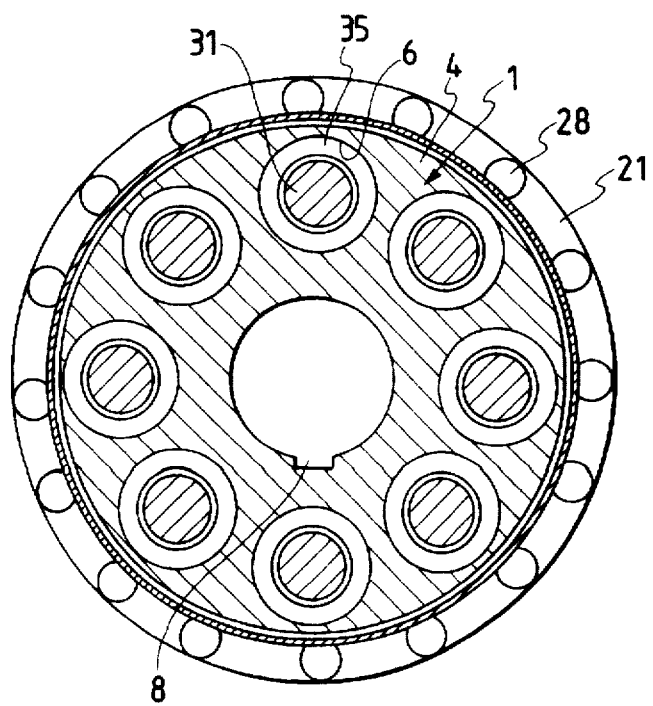
FIG. 2 is a partial cross-sectional view seen from arrows time 2—2 in FIG. 1.

FIGS. 1 and 2 show a first preferred embodiment of this invention.

A flexible shaft coupling consists essentially of a first hub 1, a second hub 11, a holder 21, pins 31 and barrel-shaped coil springs 35.

The first hub 1 has a flange 4 formed at one end of the cylindrical part 2 thereof, with eight spring holes 6 provided along the circumference of the flange 4. The cylindrical part 2 has a keyway 8 cut therein to hold a key by means of which the transmission shaft is connected to the first hub 1.

The second hub 11 has a flange 14 formed at one end of the cylindrical part 12 thereof that has a keyway 18 for connecting the transmission shaft. Pin holes 16 corresponding to the spring holes 6 in the flange 4 on the first hub 1 are provided in the end face of the flange 14.

The disc-shaped holder 21 has a hole 23 to allow the cylindrical part 2 of the first hub 1 to pass through at the center thereof. The holder 21 also has pin holes 26 that face the pin holes 16 in the flange 14 on the second hub 11. The peripheral portion of the holder 21 and the flange 14 on the second hub 11 are fixed together with connecting bolts 28. The holder 21 holds therein the flange 4 on the first hub 1 that faces the flange 14 on the second hub 11 with a clearance left therebetween. A space large enough for accommodation of shaft misalignments is left between the holder fixed to the flange 14 on the second hub 11 and the flange 4 on the first hub 1 contained therein.

Eight pieces of pins 31 are inserted in respective pin holes 16 in the flange 14 on the second hub 11 and the pin holes 26 in the holder 21. The ends of each pin 31 are supported by the second hub 11 and holder 21.

Each barrel-shaped coil spring 35 passes through the spring hole 6 in the flange 4 on the first hub 1. While the largest-diameter portion 36 of the barrel-shaped coil spring 35 is shrink-fitted in the spring hole 6 in the first hub, the smallest-diameter portions 37 thereof are shrink-fitted over the pin 31. For the barrel-shaped coil spring 35 to exhibit the nonlinear spring characteristics and hysteresis due to the contact and friction between the adjoining wires thereof that occur when the load applied thereto increases and decreases, the barrel-shaped coil spring 35 must fulfill the following requirements: The number of active coils in the barrel-shaped coil spring 35 must be between 4 and 7. The load perpendicular to the axis of the barrel-shaped coil spring 35 acting on the middle thereof must have a nonlinear relationship with the deflection thereof. The barrel-shaped coil spring 35 must exhibit a small spring constant when subjected to low loads and a great spring constant when subjected to high loads. When the spring load increases, the ratio $k_a/k_b$ in the spring constant curve, $k_a$ being the spring constant at a point where a load equal to ½ of the load acting when the inner surface of the barrel-shaped coil spring 35 is in close contact with the pin 31 acts and $k_b$ being the spring constant obtained when the spring load increases from 0, must be 3 to 8. The deflection at the intersection of the line passing the point where the ½ load acts and having a gradient equal to the spring constant $k_a$ and the line passing the point where the load is 0 and having a gradient equal to the spring constant $k_b$ must be 10% to 60% of the maximum deflection that occurs when the inner surface of the barrel-shaped coil spring 35 is in close contact with the pin 31. The barrel-shaped coil spring 35 compressed by 5% to 15% of the free length thereof is interposed between the second hub 11 and the holder 21. When torque is transmitted, the barrel-shaped coil spring 35 deforms to bring adjoining wires into contact with each other. As a consequence, the barrel-shaped coil spring 35 exhibits a nonlinear and hysteresis spring characteristic. The number of barrel-shaped coil springs furnished in the shaft coupling of this invention may be, for example, between four and twenty-four, depending on the amount of torque transmitted. The barrel-shaped coil spring is shrink- and expansion-fitted in the spring hole and over the pin. Therefore, the largest- and smallest-diameter portions of the barrel-shaped coil spring may be ground if required.

Figure 3:
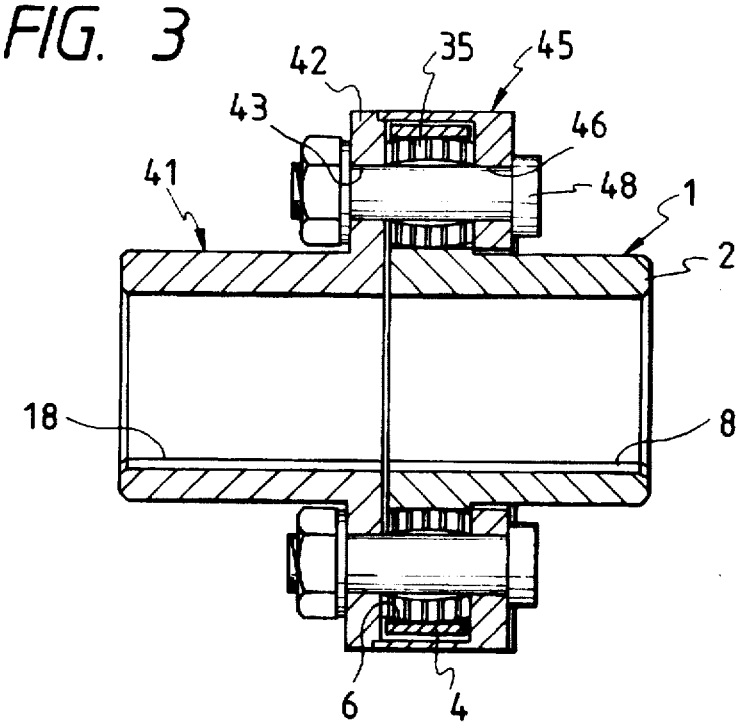
FIG. 3 is a vertical cross-sectional view of a second preferred embodiment of the flexible shaft coupling according to this invention.

FIG. 3 shows a second embodiment of this invention. Parts and members of the following embodiments similar to those of the first embodiment are designated by similar reference characters, without duplicating the description thereof.

In the second embodiment, pin holes 43 and 46 are perforated through a flange 42 on a second hub 41 and a holder 45. The connecting bolts 48 serving as the pins as described in the first preferred embodiment fix the holder 45 to the flange 42 on the second hub 41 and hold barrel-shaped coil springs 35 in position. The connecting bolts 28 of the first preferred embodiment are unnecessary in the second preferred embodiment, therefore the size of the shaft coupling is smaller than that of the first preferred embodiment and it is thus also possible to reduce its moment of inertia.

Figure 4:
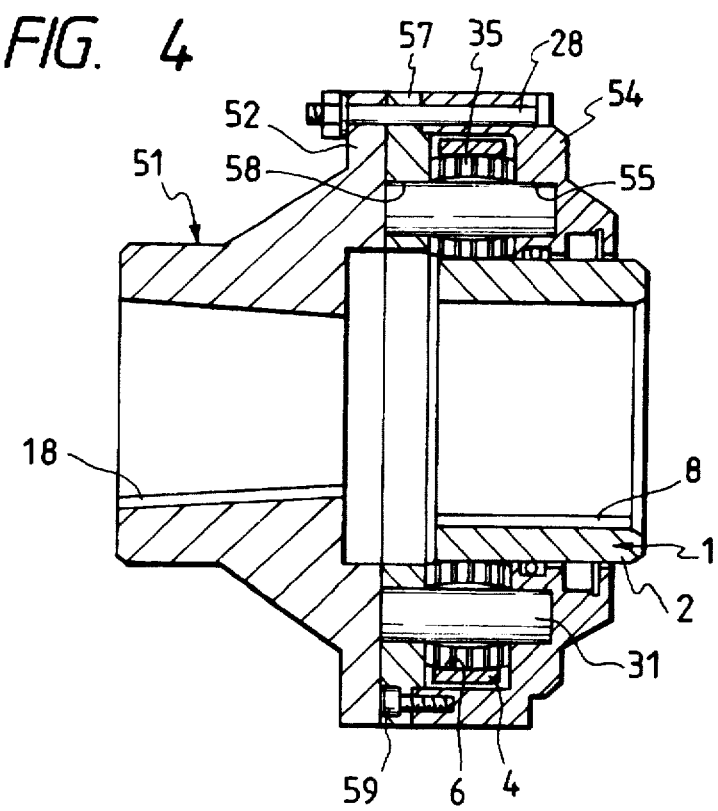
FIG. 4 is a vertical cross-sectional view of a third preferred embodiment of the flexible shaft coupling according to this invention.

FIG. 4 shows a third embodiment of this invention.

An intermediate ring 57 is inserted between a second hub 51 and a holder 54. Pin holes 58 perforated through the intermediate ring 57 are opposite to pin holes 55 in the holder 54. The intermediate ring 57 is fixed to the holder 54 with hexagonal socket-head bolts 59. The holder 54 and intermediate ring 57 are integrally fixed to a flange 52 on the second hub 51 with connecting bolts 28.

When disassembling this shaft coupling, the holder 54 and intermediate ring 57 can be integrally removed from the second hub 51. As there is no need to remove the pins 31, this shaft coupling is suited for use where the servicing space for disassembly is limited.

Now the functions of the shaft couplings just described will be explained below by reference to FIG. 5. Torque is transmitted from a drive shaft (not shown) through the first hub 1 connected thereto, the barrel-shaped coil springs 35 held by the flange 4 on the first hub, the pins 31 supported by the flange 14 on the second hub and holder 21, over which the barrel-shaped coil springs 35 are tight-fit, and the second hub 11, and then to a driven shaft (not shown) connected to the second hub 11, or in the reverse direction. At this time, the loaded side of the middle portion 36 of the barrel-shaped coil springs 35 is compressed inward to an extent that varies with the amount of the torque transmitted, while the opposite side thereof elastically extends outward.

The shaft misalignments consist of offset misalignment, angular misalignment and axial misalignment.

Figure 5:
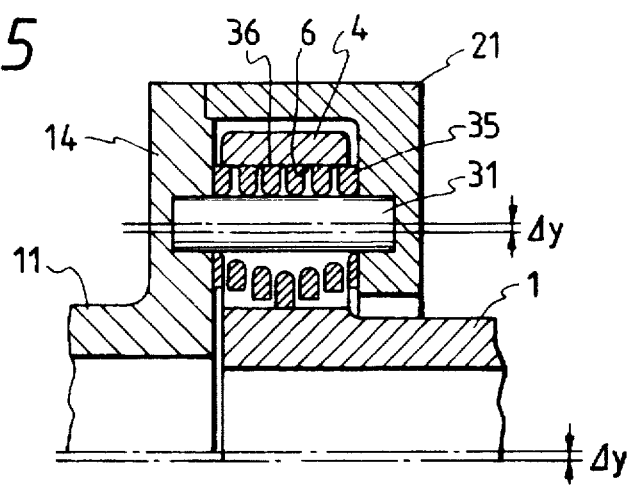
FIG. 5 illustrates the function of accommodating offset misalignment of the flexible shaft coupling according to this invention.
Figure 6:
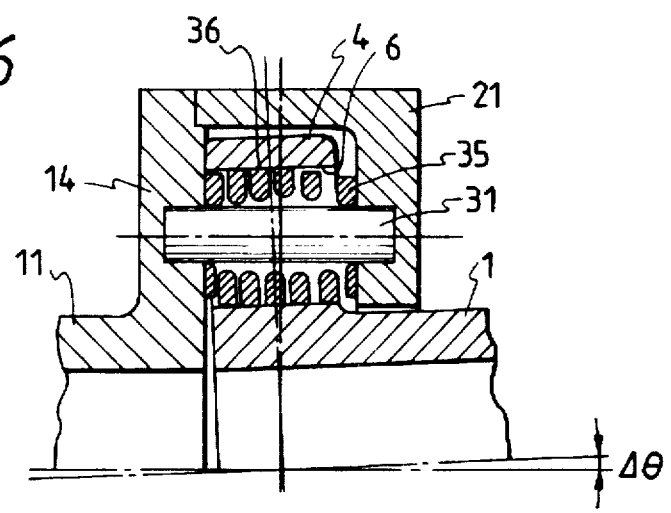
FIG. 6 illustrates the function of accommodating angular misalignment of the flexible shaft coupling according to this invention.
Figure 7:
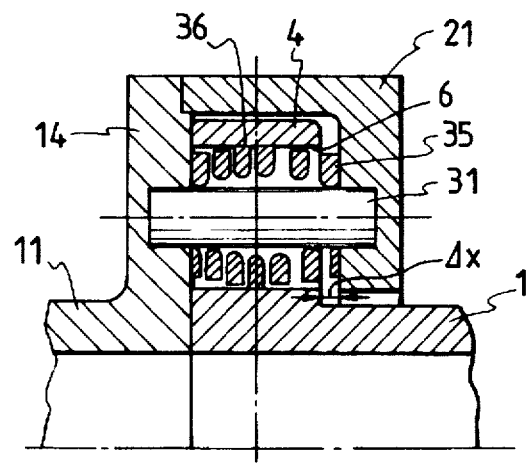
FIG. 7 illustrates the function of accommodating axial misalignment of the flexible shaft coupling according to this invention.

The offset misalignment Δy as shown in FIG. 5 is accommodated by the deflection of the barrel-shaped coil springs 35, and the angular misalignment Δθ as show in FIG. 6, and also the axial misalignment Δx as show in FIG. 7, are respectively accommodated by the deflection of the barrel-shaped coil springs 35 as shown in the figure.

Next, the characteristic of the barrel-shaped coil springs in case the above-mentioned coupling is exerted by the torque will be explained.

Figure 8:
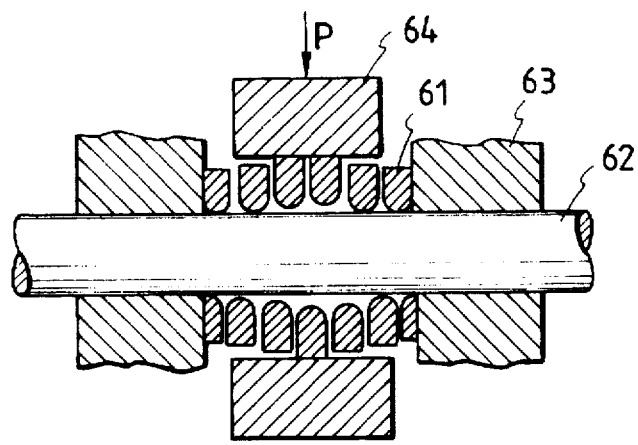
FIG. 8 illustrates a method for testing the load-deflection curve of the barrel-shaped coil springs.

FIG. 8 shows a testing method for determining the load-deflection curve of the barrel-shaped coil spring. Metal supports 63 hold both ends of a pin 62 over which a barrel-shaped coil spring 61 is fitted. Both ends of the barrel-shaped coil spring 61 are shrink fitted over the pin 62. The barrel-shaped coil spring 61 has a free length of 60 mm, a minimum inside diameter of 35 mm, and a maximum outside diameter of 65 mm. With the coil spring axially compressed to 55 mm, a load perpendicular to the spring axis is applied through a metal holder 64 to the center of the largest-diameter portion of the barrel-shaped coil spring 61.

Figure 9:
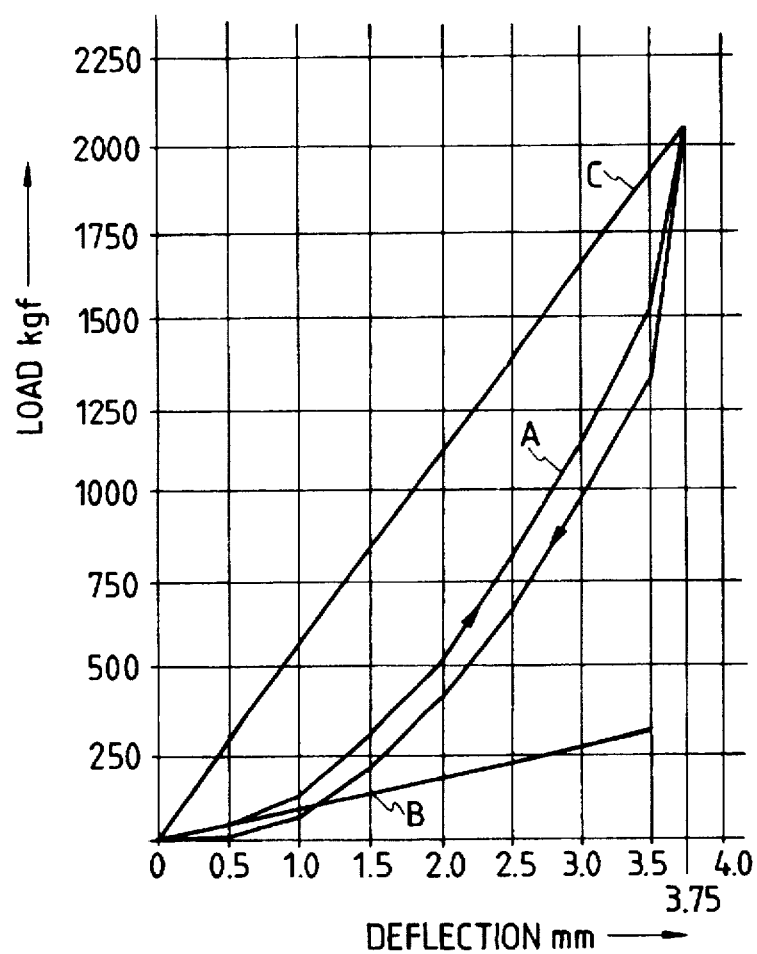
FIG. 9 shows load-deflection curves obtained from one example of the tests on the barrel-shaped coil springs.

FIG. 9 shows load-deflection curves. Nonlinear curve A, representing hysteresis, is one obtained from the above test. The area of hysteresis represents the amount of energy absorbed by the friction between adjoining coils of a spring. The spring deflecting greatly under a small load permits accommodation of great amount of shaft misalignments. Curve B, shown for comparison, was obtained in a test in which a load perpendicularly to the axis of the barrel-shaped coil spring was applied. Curve B is substantially linear, and the gradient of the rising portion of curve A substantially agrees with that of curve B. In this case, only elastic deflection occurred, without any friction between the adjoining coils. Curve C was obtained by applying a load along the axis of a cylindrical coil spring that exhibited the same amount of deflection under the maximum testing load. The ratio $k_a/k_b$, $k_a$ being the spring constant at point $P_{1/2}$ where a load equal to ½ of the load acting when the inner surface of the barrel-shaped coil spring is in close contact with the pin acts and $k_b$ being the spring constant obtained when the spring load increases from 0, is 6.5. The deflection at the intersection of line A' passing the point where the ½ load acts and having a gradient equal to the spring constant $k_a$ and line B passing the point where the load is 0 and having a gradient equal to the spring constant $k_b$ is 1.38 mm or 37% of the maximum deflection of 3.75 mm. The spring constant gradually changes from $k_b$ to $k_a$ within the range of 0.5 mm to 2.5 mm substantially on both sides of the defection of 1.38 mm described above.

FIG. 10 is a torque-reducing curve schematically illustrating the shock-absorbing and torsional-vibration reducing functions. Curve A is for a flexible shaft coupling of this invention and curve B is for a conventional rigid shaft coupling such as a gear or a disk type shaft coupling. Obviously, the flexible shaft coupling of this invention has much greater shock-absorbing and torsional-vibration reducing abilities than the conventional couplings because of the great amount of resiliency and the friction between the adjoining coils. The shock-absorbing and torsional-vibration reducing functions of the flexible shaft coupling of this invention, when expressed as percentages $T_2/T_1$ and $S_2/S_1$, are 60 to 70% and 20 to 60%, respectively.

The barrel-shaped coil springs used as a resilient elements for torque transmission in this invention deflect greatly at right angles to the axis thereof while exerting small stresses. The extremely small spring constant under smaller loads assures an excellent accommodation of shaft misalignments without exerting much reaction force on the coupling.

The spring characteristic of a barrel-shaped coil spring fitted to the flexible coupling so that the adjoining coils thereof produce friction therebetween appears as a nonlinear hysteresis loop. The extremely great spring constant under heavier loads permits transmission of large torque. The deflection of the barrel-shaped coil spring and the friction produced by the adjoining coils thereof, in combination, absorb shock load from the transmission shaft and damp torsional vibration. Thus, the flexible shaft coupling of this invention absorbs a large shock load and quickly reduces torsional vibration.

The barrel-shaped coil springs fitted tight inside and outside, cause no backlash. This feature assures high-speed rotation and high-precision positional control.

Having the excellent features described above, the flexible shaft couplings of this invention are suited for practically all types of applications, particularly for machines and equipment subjected to heavy duties, such as those used in the steel industry, and those necessitating high speed and high accuracy, such as those used for printing. The flexible shaft coupling of Geislinger having a nonlinear spring characteristic is suited primarily for large couplings used in marine diesel engines and the like. By comparison, the flexible shaft coupling of this invention, which is much smaller than Geislinger's, is available in the wide size range of 80 mm to 2,000 mm in outer diameter.

Now some applications of the flexible shaft coupling according to this invention will be described. The parts similar to those in the first embodiment described before will be designated by similar reference characters, without repeating their detailed description.

FIG. 11 shows a flexible shaft coupling of this invention used in a vertical-shaft transmission system.

The flexible shaft coupling is held upright, with a drive and a driven shaft connected to the upper second hub 11 and the lower first hub 1, respectively. A motor is connected to the drive shaft and a pump is connected to the driven shaft. The flange face 5 of the first hub 1, which constitutes a portion of a spherical surface, supports a load on the drive shaft side. When any misalignment occurs between the drive and driven shafts, the flange face 15 of the second hub 11 rotatingly tilts over the spherical flange face 5 of the first hub 1, with the resulting deflection of the barrel-shaped coil springs 35 accommodating the angular misalignment between the drive and driven shafts.

FIG. 12 shows a shaft coupling consisting of a combination of two flexible shaft couplings of this invention fixed together. In each of the two shaft couplings, the flange 4 of the first hub 1 is held between the holder 21 and an annular cover 75. The barrel-shaped coil springs 35 compressed between the holder 21 and annular cover 75 are held in the spring holes 6 in the flange 4. The pins 31 supported by the holder 21 and annular cover 75 pass through the barrel-shaped coil springs 35. Bolts 77 fasten together the two shaft couplings just described, with the mating faces of the annular covers 75 thereof kept in contact with each other.

Having a twice larger aligning capability than a single-unit counterpart, this dual flexible shaft coupling also has substantially twice as large shock absorbing and vibration damping capabilities.

FIG. 13 shows a shaft coupling consisting of a combination of two flexible shaft couplings of this invention fixed together with an intermediate shaft therebetween. Each shaft coupling consists of the same members as those shown in FIGS. 1 and 2. The first hubs 1 of the two shaft couplings are connected through an intermediate shaft 79 inserted therein. A drive and a driven shaft are connected to the second hubs 11 at opposite ends. The distance between the drive and driven shafts can be changed by changing the length of the intermediate shaft 79. This shaft coupling has greater accommodation of shaft misalignments, shock absorbing and vibration reducing functions than the one shown in FIG. 12. The position of the first hub 1 and the second hub 11 may be reversed: the first hub 1 may be on the outside and the second hub 11 on the inside.

FIG. 14 shows a flexible shaft coupling of this invention incorporated in a V-belt pulley. A holder 81 has V-belt grooves 82 cut around the periphery thereof. An annular cover 84 is fixed to the holder 81 with bolts 86, with the flange 4 of a hub 1 held between the holder 81 and annular cover 84. Barrel-shaped coil springs 35 compressed between the holder 81 and annular cover 84 are held in the spring holes 6 in the flange 4 of the hub 1. Pins 31 supported by the holder 81 and annular cover 84 pass through the barrel-shaped coil springs 35. A drive or a driven shaft is connected to the hub 1.

A flat-belt pulley can also incorporate a flexible shaft coupling of this invention in the same way as the V-belt pulley described above does. The difference between the flat- and V-belt pulleys is that the holder of the former has a groove-less cylindrical peripheral surface. The flexible shaft couplings incorporated in these belt pulleys absorb the shock load on their transmission mechanism and reduce vibration caused thereby.

FIG. 15 shows a flexible shaft coupling of this invention incorporated in a sprocket. The construction of the sprocket is essentially similar to that of the belt pulley. The difference between the sprocket and belt pulley is that the former has teeth 87 to engage with a chain cut around the periphery of the holder 85 thereof. The function and effect of the sprocket are similar to those of the belt pulleys described before.

FIGS. 16 and 17 show a flexible shaft coupling of this invention incorporated in an air clutch.

A rim 92 having a frictional surface surrounds a cover 91. A holder 21 is fixed to the cover with bolts 93, with the flange 4 of a first hub 1 held between the cover 91 and holder 21. Barrel-shaped coil springs 35 compressed between the cover 91 and holder 21 are held in the spring holes in the flange 4 of the first hub 1. Pins 31 supported by the cover 91 and holder 21 pass through the barrel-shaped coil springs 35. A cylindrical member 96 is fixed to the flange 95 of a second hub 94 with bolts 97. A hollow rubber ring 99, with the internal surface thereof lined with a frictional material 100, is fitted in the cylindrical member 96. A compressed air source (not shown) is connected to the hollow ring 99. A drive shaft 102 and a driven shaft 103 are respectively connected to the first hub 1 and the second hub 94.

FIG. 16 shows the air clutch in the state of OFF. When compressed air is supplied, the hollow ring 99 expands inwardly as shown in FIG. 17, whereby the frictional material 100 comes in contact with the outer surface of the rim 92. As a consequence, torque is transmitted from the drive shaft 102 to the driven shaft 103 through the first hub 1, barrel-shaped coil springs 35, pin 31, cover 91, hollow ring 99 and second hub 94. The function and effect of this air clutch are similar to those of the belt pulleys described before.

FIG. 18 shows a brake in which a flexible shaft coupling of this invention is incorporated. The brake has a brake drum whose construction is essentially similar to the flexible shaft coupling shown in FIG. 1. A rim 108 surrounds the flange 106 of a second hub 105 as shown in FIG. 19, with the brake applying its frictional force on the external surface of the rim 108. A holder 21 is fixed to the flange 106 of the second hub 105 with bolts 110. The flange 4 of a first hub 1 is held between the flange 106 and holder 21. Barrel-shaped coil springs 35 compressed between the flange of the second hub 105 and holder 21 are held in the spring holes 6 in the flange 4 of the first hub 1. Pins 31 supported by the flange 106 of the second hub 105 and holder 21 pass through the barrel-shaped coil springs 35. A driven shaft and a drive shaft are respectively connected to the first hub 1 and second hub 105.

As shown in FIG. 18 a pair of curved brake shoes 112 and 115 facing each other are connected to a bed 117 with pins 118. The first brake shoe 112 and second brake shoe 115 are linked together with a connecting rod 120. The connecting rod 120 passes through the flange 113 of the first brake shoe 112, with an adjusting nut 122 screwed over one end thereof and a coil spring 124 interposed between the flange 113 and adjusting nut 122. The coil spring 124 exerts a force to bring the first brake shoe 112 and second brake shoe 115 closer to each other. A hydraulic cylinder 128 is connected to the first brake shoe 112 through a drive rod 126. When the hydraulic cylinder 128 is actuated, a piston rod 129 ascends to detach the brake shoes from the brake working face of the rim 108 mentioned before, thereby rendering the brake inactive. When the hydraulic cylinder 128 is stopped, the piston rod 129 descends to bring the brake shoes 112 and 115 into contact with the brake working face of the rim 108, thereby rendering the brake active.

FIG. 20 shows a torque limiter in which a flexible shaft coupling of this invention is incorporated. An annular cover 134 rotatably fitted over a second hub 131 is connected to a holder 21 with bolts 137. The flange 4 of a first hub 1 is held between the annular cover 134 and holder 21. Barrel-shaped coil springs 35 compressed between the annular cover 134 and holder 21 are held in the spring holes 6 in the flange 4 of the first hub 1. Pins 31 supported by the annular cover 134 and holder 21 pass through the barrel-shaped coil springs 35. Eight diametrically extending arced grooves 135 are provided in a face of the annular cover opposite to the face to which the holder 21 is connected at given circular intervals, as shown in FIGS. 21 to 23. A movable ring 141 that moves axially by means of a sliding key 144 is attached to the second hub 131. The movable ring 141 has roller grooves 142 facing the arced grooves 135. A roller 145 is fitted in each roller groove 142, with part of the roller 145 being fitted in the opposite arced groove 135. A Belleville spring 149 is interposed between the movable ring 141 and an adjusting nut 147 screwed over the second hub 131. A drive shaft and a driven shaft are respectively connected to the first hub 1 and second hub 131. The Belleville spring 149 presses the roller 145 against the bottom of the arced groove 145 through the movable ring 141.

In the torque limiter just described, torque is transmitted from the drive shaft to the driven shaft through the first hub 1, barrel-shaped coil springs 35, pin 31, annular cover 134, rollers 145, movable ring 141, and second hub 131. When an excess torque is transmitted to the driven shaft and the torque that has been reaches the disengagement torque previously preset, the arced grooves 135 in the annular cover move away from the rollers 145, thereby disengaging the annular cover 134 from the movable ring 141 and, consequently, disconnecting the transmission of torque from the drive shaft to the driven shaft.

What is claimed is:

1. A flexible coupling for rotatable shafts, comprising:
   a first hub connected to a transmission shaft, having a cylindrical part, an outwardly extending flange at one end of said cylindrical part and a plurality of spring holes extending through said flange circumferentially spaced along the periphery thereof;
   a second hub connected to a transmission shaft, having a cylindrical part, and an outwardly extending flange at one end of said cylindrical part;
   a holder fixed to said flange of said second hub such that said flange of said first hub is held between said holder and said flange of said second hub, said cylindrical part of said first hub extending through said holder, and said flange of said first hub and each of said flange of said second hub and said holder having a space therebetween sufficient to accommodate shaft misalignments;
   pins supported between said flange of said second hub and said holder; and
   barrel-shaped coil springs each passed through a spring hole in the flange of said first hub, each barrel-shaped coil spring being compressed between the flange of said second hub and said holder by 5% to 15% of the free length thereof, the largest- and smallest-diameter portions of each barrel-shaped coil spring being shrink-fitted in the spring hole in the first hub and expansion-fitted over said pin, each barrel-shaped coil spring comprising four to seven active coils, with a ratio $k_a/k_b$, $k_a$ being the spring constant at a point where an increasing load equal to ½ of the load acting when the inner surface of the barrel-shaped coil spring is in close contact with the pin acts and $k_b$ being the spring constant obtained when the spring load increases from 0, being between 3 and 8, and the deflection at the intersection of the line passing the point where the ½ load acts and having a gradient equal to the spring constant $k_a$ and the line passing the point where the load is 0 and having a gradient equal to the spring constant $k_b$ being 10% to 60% of the maximum deflection that occurs when the inner surface of the barrel-shaped coil spring is in close contact with the pin;
   wherein a load perpendicular to the spring axis brings adjoining coils of the coil spring into contact with each other, with the resulting friction causing the coil spring to exhibit a hysteretic spring characteristic and generate sufficient energy to absorb shocks and reduce torsional vibration.

2. The flexible coupling of claim 1, wherein:
   said holder and said flange of said second hub have closed-end pin holes therein in which ends of said pins are inserted and supported;
   said second hub and said holder are fixed together with bolts that pass through peripheral portions of said second hub and said holder.

3. The flexible coupling of claim 1, wherein:
   said pins are comprised of bolts fixing together said second hub and said holder, said bolts having pin portions that pass through said second hub and said holder; and
   said end portions of said coil springs are fitted tight over said pin portions of said bolts.

4. The flexible coupling of claim 1, wherein:
   said central bulging portions of said coil springs are shrink-fitted in said spring holes.

5. The flexible coupling of claim 1, wherein:
   said end portions of said coil springs are expansion-fitted on said pins.

6. The flexible coupling of claim 1, wherein said end portions and said central bulging portions of said coil springs have ground surfaces.

7. The flexible coupling of claim 1, wherein one of said outwardly extending flanges of said first and second hubs comprises a flange face having the shape of a portion of a spherical surface.

8. A flexible coupling for rotatable shafts, comprising: two coupling members, each of said coupling members comprising:
   a hub connected to a transmission shaft and having a cylindrical part, an outwardly extending flange at one end of said cylindrical part and a plurality of spring holes extending through said flange spaced circumferentially along the periphery thereof,
   a holder through which said cylindrical part extends, said holder having an end face, an annular cover held in contact with said end face of said holder such that said flange of said hub is held between said holder and said annular cover, and said flange of said hub and each of said annular cover and said holder having a space therebetween sufficient to accommodate shaft misalignments, pins supported between said annular cover and said holder, and barrel-shaped coil springs each passed through a spring hole in the flange of said hub, each barrel-shaped coil spring being compressed between said annular cover and said holder by 5% to 15% of the free length thereof, the largest and smallest-diameter portions of each barrel-shaped coil spring being shrink-fitted in the spring hole in the first hub and expansion-fitted over said pin, each barrel-shaped coil spring comprising four to seven active coils, with a ratio $k_a/k_b$, $k_a$ being the spring constant at a point where an increasing load equal to ½ of the load acting when the inner surface of the barrel-shaped coil spring is in close contact with the pin acts and $k_b$ being the spring constant obtained when the spring load increases from 0, being between 3 and 8, and the deflection at the intersection of the line passing the point where the ½ load acts and having a gradient equal to the spring constant $k_a$ and the line passing the point where the load is 0 and having a gradient equal to the spring constant $k_b$ being 10% to 60% of the maximum deflection that occurs when the inner surface of the barrel-shaped coil spring is in close contact with the pin;

wherein said two coupling members are fixed together with said annular covers thereof facing each other;

wherein a load perpendicular to the spring axis brings adjoining coils of the coil spring into contact with each other, with the resulting friction causing the coil spring to exhibit a hysteretic spring characteristic and generate sufficient energy to absorb shocks and reduce torsional vibration.

9. A flexible coupling for rotatable shafts, comprising:

two coupling members, each of said coupling members comprising:

a first hub connected to a transmission shaft, having a cylindrical part, an outwardly extending flange at one end of said cylindrical part and a plurality of spring holes extending through said flange circumferentially spaced along the periphery thereof, a second hub connected to a transmission shaft, having a cylindrical part, and an outwardly extending flange at one end of said cylindrical part, a holder fixed to said flange of said second hub such that said flange of said first hub is held between said holder and said flange of said second hub, said cylindrical part of said first hub extending through said holder, and said flange of said first hub and each of said flange of said second hub and said holder having a space therebetween sufficient to accommodate shaft misalignments, pins supported between said flange of said second hub and said holder, and barrel-shaped coil springs each passed through a spring hole in the flange of said first hub, each barrel-shaped coil spring being compressed between the flange of said second hub and said holder by 5% to 15% of the free length thereof, the largest- and smallest-diameter portions of each barrel-shaped coil spring being shrink-fitted in the spring hole in the first hub and expansion-fitted over said pin, each barrel-shaped coil spring comprising four to seven active coils, with a ratio $k_a/k_b$, $k_a$ being the spring constant at a point where an increasing load equal to ½ of the load acting when the inner surface of the barrel-shaped coil spring is in close contact with the pin acts and $k_b$ being the spring constant obtained when the spring load increases from 0, being between 3 and 8, and the deflection at the intersection of the line passing the point where the ½ load acts and having a gradient equal to the spring constant $k_a$ and the line passing the point where the load is 0 and having a gradient equal to the spring constant $k_b$ being 10% to 60% of the maximum deflection that occurs when the inner surface of the barrel-shaped coil spring is in close contact with the pin;

wherein said two coupling members are fixed together by an intermediate shaft connecting one of said hubs of one of said coupling members with one of said hubs of the other of said coupling members;

wherein a load perpendicular to the spring axis brings adjoining coils of the coil spring into contact with each other, with the resulting friction causing the coil spring to exhibit a hysteretic spring characteristic and generate sufficient energy to absorb shocks and reduce torsional vibration.

10. A flexible coupling for rotatable shafts, comprising:

a hub connected to a transmission shaft and having two cylindrical parts and a middle part therebetween, an outwardly extending flange at said middle part of said cylindrical part and a plurality of spring holes extending through said flange circumferentially spaced along the periphery thereof;

a holder through which one of said two cylindrical parts extends, said holder having an end face and a peripheral belt contact surface for contacting a belt;

an annular cover through which the other of said two cylindrical parts extends, said annular cover being held in contact with said end face of said holder such that said flange of said hub is held between said holder and said annular cover;

pins supported between said annular cover and said holder; and barrel-shaped coil springs each passed through a spring hole in the flange of said hub, each barrel-shaped coil spring being compressed between said annular cover and said holder by 5% to 15% of the free length thereof, the largest and smallest-diameter portions of each barrel-shaped coil spring being shrink-fitted in the spring hole in the first hub and expansion-fitted over said pin, each barrel-shaped coil spring comprising four to seven active coils, with a ratio $k_a/k_b$, $k_a$ being the spring constant at a point where an increasing load equal to ½ of the load acting when the inner surface of the barrel-shaped coil spring is in close contact with the pin acts and $k_b$ being the spring constant obtained when the spring load increases from 0, being between 3 and 8, and the deflection at the intersection of the line passing the point where the ½ load acts and having a gradient equal to the spring constant $k_a$ and the line passing the point where the load is 0 and having a gradient equal to the spring constant $k_b$ being 10% to 60% of the maximum deflection that occurs when the inner surface of the barrel-shaped coil spring is in close contact with the pin;

wherein a load perpendicular to the spring axis brings adjoining coils of the coil spring into contact with each other, with the resulting friction causing the coil spring to exhibit a hysteretic spring characteristic and generate sufficient energy to absorb shocks and reduce torsional vibration.

11. A flexible coupling for rotatable shafts, comprising:

a hub connected to a transmission shaft and having two cylindrical parts and a middle part therebetween, an outwardly extending flange at said middle part of said cylindrical part and a plurality of spring holes extending through said flange circumferentially spaced along the periphery thereof;

a holder through which one of said two cylindrical parts extends, said holder having an end face and a peripheral surface provided with teeth for engaging a transmission chain;

an annular cover through which the other of said two cylindrical parts extends, said annular cover being held in contact with said end face of said holder such that said flange of said hub is held between said holder and said annular cover;

pins supported between said annular cover and said holder; and barrel-shaped coil springs each passed through a spring hole in the flange of said hub, each barrel-shaped coil spring being compressed between said annular cover and said holder by 5% to 15% of the free length thereof, the largest- and smallest-diameter portions of each barrel-shaped coil spring being shrink-fitted in the spring hole in the first hub and expansion-fitted over said pin, each barrel-shaped coil spring comprising four to seven active coils, with a ratio $k_a/k_b$, $k_a$ being the spring constant at a point where an increasing load equal to ½ of the load acting when the inner surface of the barrel-shaped coil spring is in close contact with the pin acts and $k_b$ being the spring constant obtained when the spring load increases from 0, being between 3 and 8, and the deflection at the intersection of the line passing the point where the ½ load acts and having a gradient equal to the spring constant $k_a$ and the line passing the point where the load is 0 and having a gradient equal to the spring constant $k_b$, being 10% to 60% of the maximum deflection that occurs when the inner surface of the barrel-shaped coil spring is in close contact with the pin.

12. A flexible coupling for rotatable shafts, comprising:

a first hub connected to a transmission shaft, having a cylindrical part, an outwardly extending flange at one end of said cylindrical part and a plurality of spring holes extending through said flange circumferentially spaced along the periphery thereof;

a second hub connected to a transmission shaft, having a cylindrical part, and an outwardly extending flange at one end of said cylindrical part;

a holder fixed to said flange of said second hub, having a plurality of pin holes, and said cylindrical part of said first hub extending through said holder;

an annular intermediate ring interposed between said first and second hubs, having a plurality of pin holes, said second hub and said holder fixed together through said intermediate ring by bolts extending through peripheral portions of said second hub, said intermediate ring and said holder, and said flange of said first hub, said holder and said intermediate ring having a space therebetween sufficient to accommodate shaft misalignments;

a plurality of pins having ends inserted into said pin holes provided in said holder and said intermediate ring and supported therein;

barrel-shaped coil springs each passed through a spring hole in the flange of said first hub, each barrel-shaped coil spring being compressed between said holder and said intermediate ring by 5% to 15% of the free length thereof, the largest- and smallest-diameter portions of each barrel-shaped coil spring being shrink-fitted in the spring hole in the first hub and expansion-fitted over said pin, each barrel-shaped coil spring comprising four to seven active coils, with the ratio $k_a/k_b$, $k_a$ being the spring constant at a point where an increasing load equal to ½ of the load acting when the inner surface of the barrel-shaped coil spring is in close contact with the pin acts and $k_b$ being the spring constant obtained when the spring load increases from 0, being between 3 and 8, and the deflection at the intersection of the line passing the point where the ½ load acts and having a gradient equal to the spring constant $k_a$ and the line passing the point where the load is 0 and having a gradient equal to the spring constant $k_b$ being 10% to 60% of the maximum deflection that occurs when the inner surface of the barrel-shaped coil spring is in close contact with the pin;

wherein a load perpendicular to the spring axis brings adjoining coils of the coil spring into contact with each other, with the resulting friction causing the coil spring to exhibit a hysteretic spring characteristic and generate sufficient energy to absorb shocks and reduce torsional vibration.

* * * * *